US012791391B2

(12) United States Patent
Jobert

(10) Patent No.: US 12,791,391 B2
(45) Date of Patent: Nov. 10, 2026

(54) INFRARED IMAGING DEVICE

(71) Applicant: LYNRED, Palaiseau (FR)

(72) Inventor: Gabriel Jobert, Veurey-Voroize (FR)

(73) Assignee: LYNRED, Palaiseau (FR)

( * ) Notice: Subject to any disclaimer, the term of this patent is extended or adjusted under 35 U.S.C. 154(b) by 289 days.

(21) Appl. No.: 18/698,187

(22) PCT Filed: Oct. 7, 2022

(86) PCT No.: PCT/EP2022/077974
§ 371 (c)(1),
(2) Date: Apr. 3, 2024

(87) PCT Pub. No.: WO2023/057635
PCT Pub. Date: Apr. 13, 2023

(65) Prior Publication Data

US 2024/0328862 A1 Oct. 3, 2024

(30) Foreign Application Priority Data

Oct. 8, 2021 (FR) ....................................... 2110690

(51) Int. Cl.
*G01J 5/08* (2022.01)
*G01J 5/02* (2022.01)
*G01J 5/00* (2022.01)

(52) U.S. Cl.
CPC ........... *G01J 5/0859* (2013.01); *G01J 5/0205* (2013.01); *G01J 5/0879* (2022.01); *G01J 2005/0077* (2013.01)

(58) Field of Classification Search
CPC ...... G01J 5/0859; G01J 5/0205; G01J 5/0879; G01J 2005/0077; G01J 3/0208;
(Continued)

(56) References Cited

U.S. PATENT DOCUMENTS 5,981,937 A 11/1999 Denaro
6,166,764 A * 12/2000 Sakata .................. H04N 7/183 348/148
(Continued)

FOREIGN PATENT DOCUMENTS

DE 102013210887 A1 12/2014
FR 2895525 A1 6/2007
(Continued)

OTHER PUBLICATIONS

Written Opinion for PCT/EP2022/077974 mailed Jan. 25, 2023 (English Translation).
(Continued)

*Primary Examiner* — Mariam Qureshi
(74) *Attorney, Agent, or Firm* — Perilla Knox & Hildebrandt LLP; Jason M. Perilla

(57) ABSTRACT

The present description concerns an infrared imaging device (200) comprising an infrared camera (210) having an optical axis (A), said camera being intended to detect an infrared radiation in a spectral range through an element (132) transparent to said infrared radiation, the transparent element being inclined by an angle of inclination (α) greater than 0° and smaller than 90° or smaller than 0° and greater than −90° relative to an image capture direction (C);

the device further comprising a refractor element (230) transparent to the infrared radiation in the spectral range and adapted to be positioned between the transparent element and the infrared camera, said refractor element comprising a virtual exit facet of the refractor element, corresponding to an exit facet (234) of the refractor element in a tunnel diagram of said refractor element, said virtual exit facet being substantially parallel to an entry facet (232) of the refractor element.

17 Claims, 5 Drawing Sheets

(58) Field of Classification Search
CPC ...... G01J 3/0229; G01J 2003/145; G01J 3/14; G01J 3/2823; G01J 2003/2813; G02B 13/14; G02B 13/18; G02B 1/11; G02B 7/021; G02B 27/0972; H10F 30/22; H10F 77/407; H10F 77/50; H04N 23/55; H04N 23/20; G03B 11/00
See application file for complete search history.

(56) References Cited

U.S. PATENT DOCUMENTS

| | | | | |
|---|---|---|---|---|
| 6,256,155 | B1 | 7/2001 | Nagaoka | |
| 2007/0216768 | A1* | 9/2007 | Smith | B60R 11/04 348/118 |
| 2009/0212202 | A1 | 8/2009 | Takahashi | |
| 2013/0162827 | A1 | 6/2013 | Eickhoff et al. | |
| 2021/0088745 | A1 | 3/2021 | Li et al. | |

FOREIGN PATENT DOCUMENTS

| | | | | |
|---|---|---|---|---|
| GB | 2433608 | A * | 6/2007 | G02B 13/14 |
| WO | 2019201557 | A1 | 10/2019 | |

OTHER PUBLICATIONS

International Search Report ad written Opinion for PCT/EP2022/077974 mailed Jan. 25, 2023.
Search Report for French Application No. 21/10690 mailed Jun. 7, 2022.

* cited by examiner

INFRARED IMAGING DEVICE

CROSS-REFERENCE TO RELATED APPLICATIONS

This application is a 35 U.S.C. § 371 national stage patent application of Patent Cooperation Treaty application number PCT/EP2022/077974, filed Oct. 7, 2022, titled "INFRARED IMAGING DEVICE," which claims the benefit of and priority to French patent application number 21/10690, filed on Oct. 8, 2021, the entire contents of each of which applications are hereby incorporated herein by reference.

TECHNICAL FIELD

The present disclosure generally concerns the field of infrared imaging and particularly concerns an infrared camera in which an image is detected by said infrared camera through a porthole transparent to infrared radiation.

PRIOR ART

In the field of infrared imaging, an infrared camera ("IR camera"), adapted to capturing thermal images of a scene, may be used. An IR camera typically comprises an arrangement of infrared-sensitive detectors forming a pixel array. Each pixel of the pixel array converts a temperature measured at the pixel into a corresponding voltage signal, which is converted by a digital-to-analog converter (ADC) into a digital output signal. A microbolometer is an example of a pixel used for an uncooled infrared pixel array camera, adapted to capturing thermal images of a scene.

In certain applications, an IR camera may be positioned within an enclosure, or at least be arranged behind a wall, so that the radiation is detected by the IR camera through the wall. This wall may be inclined at a non-zero angle with respect to the vertical direction. When the material of the wall is not transparent to IR radiation, the wall is provided with an element transparent to IR radiation, for example a porthole, this porthole being positioned so that the IR camera can receive IR radiation through said porthole. Generally, such a porthole has the smallest possible lateral dimensions.

However, when the wall is inclined, so is the porthole. The presence of an inclined porthole having a reduced pupil may generated an unwanted vignetting phenomenon on the image captured by the IR camera, that is, a decrease in the brightness on the edges of the image (in other words, an increase in the opacity on the edges of the image). The phenomenon may worsen as the distance between the porthole and the IR camera increases.

SUMMARY OF THE INVENTION

There exists a need to control the vignetting phenomenon for an infrared camera intended to be positioned behind an inclined wall.

An embodiment overcomes all or part of the above-mentioned disadvantages.

An embodiment provides an infrared imaging device comprising an infrared camera having an optical axis, said camera being intended to detect an infrared radiation in a spectral range through an element transparent to said infrared radiation, the transparent element being inclined by an angle of inclination greater than 0° and smaller than 90° or smaller than 0° and greater than −90° with respect to an image capture direction;

the device further comprising a refractor element transparent to the infrared radiation in the spectral range and capable of being positioned between the transparent element and the infrared camera, said refractor element comprising a virtual exit facet of the refractor element, corresponding to an exit facet of the refractor element in a tunnel diagram of said refractor element, said virtual exit facet being substantially parallel to an entry facet of the refractor element.

The transparent element comprises two surfaces, an entry surface and an exit surface, preferably substantially planar and parallel to each other.

According to an embodiment, the entry facet is adapted to refracting an infrared ray of the spectral range penetrating into the refractor element, and is intended to be positioned in front of the transparent element, the exit facet is adapted to refracting the infrared ray coming out of the refractor element, and is positioned in front of the infrared camera, the refractor element further comprising at least one intermediate facet adapted to reflecting the infrared ray between the entry facet and the exit facet.

According to an embodiment, the inner surface of the intermediate facet is covered with a reflective coating adapted to increasing the reflection of the infrared radiation on said inner surface, for example a metallic coating.

According to an embodiment, the intermediate facet comprises at least one surface adapted to correcting optical aberrations, for example an uneven surface of free-form type, for example, non-axisymmetrical.

According to an embodiment, the refractor element and the infrared camera are positioned with respect to each other so that the refracted optical axis of the refractor element is substantially parallel to, or substantially coincides with, the optical axis of the infrared camera.

According to an embodiment, the optical axis of the infrared camera is offset by a distance with respect to the refracted optical axis of the refractor element in a direction perpendicular to said refracted optical axis.

According to an embodiment, the outer surface of the entry facet and/or the outer surface of the exit facet is coated with an anti-reflective coating.

According to an embodiment, the refractor element is a prism. According to an example, the prism generates no chromatic dispersion.

According to a specific embodiment, the prism is of Dove prism type, said prism having the shape of a pyramid with a truncated rectangular base comprising a first base, a second base having a smaller surface area than said first base, a first lateral plane coupling the first and second bases and inclined by a first angle with respect to the first base, a second lateral plane coupling the first and second bases, facing the first lateral plane and inclined by a second angle with respect to the first base, the second angle being the opposite of the first angle, the first angle being greater than 0° and smaller than 90°, for example between 3° and 60°, the first lateral plane forming the entry facet, the second lateral plane forming the exit facet, and the first base forming the intermediate facet.

According to a specific embodiment, the prism is a half-pentaprism of Bauernfeind prism type, said prism comprising a base forming the entry facet, a first lateral plane arranged in front of the base and forming the intermediate facet, and a second lateral plane coupling the base and the first lateral plane and forming the exit facet. According to an example, the facets are oriented with respect to one another so that an infrared ray is refracted through the entry facet at an angle equal to the angle of incidence of the exit facet.

According to an embodiment, the entry facet of the refractor element has a surface area greater than or equal to the surface area of the transparent element.

According to an embodiment, the entry facet of the refractor element is substantially parallel to the transparent element.

According to an embodiment, the exit facet has a surface area substantially equal to the surface area of the entry facet.

According to an embodiment, the exit facet has a surface area smaller than the surface area of the entry facet.

According to an embodiment, the infrared camera further comprises at least one lens and a lens mount, said at least one lens being held by said lens mount, at least one lens and/or the lens mount comprising a truncated surface adapted to being positioned in front of the exit facet of the refractor element, the truncated surface being for example substantially parallel to the exit facet.

According to an embodiment, the infrared camera comprises:

- at least one lens and a lens mount, said at least one lens being held by said lens mount;
- an image sensor sensitive to the infrared radiation of the spectral range;

the image sensor and the at least one lens defining the optical axis of the infrared camera, the image sensor being arranged substantially in the image focal plane of said at least one lens.

According to a specific embodiment, the at least one lens is at least partially surrounded by the lens mount.

According to an embodiment, the transparent element is surrounded by a mount and is adapted to being inserted with said mount in the opening of a wall, at least a portion of the wall in which the transparent element is inserted being inclined by the same angle of inclination as the transparent element.

The transparent element is preferably included in the volume freed by the wall opening, that is, the volume corresponding to the wall opening. For example, the transparent element does not laterally protrude on either side of the opening.

Preferably, the wall is inclined by the angle of inclination around the opening. For example, the wall is entirely inclined by the angle of inclination.

According to a specific embodiment, the device comprises means for attaching the refractor element adapted to attaching said refractor element to the wall or to the mount.

According to a specific embodiment, the device comprises an interface element adapted to forming an interface between the infrared camera and the mount, said interface element being further adapted to holding the refractor element between the transparent element and the infrared camera.

According to an embodiment, at least one inner surface of the interface element is shaped in such a way as to decrease the emission of infrared radiation by said interface element towards the camera.

According to an embodiment, at least one inner surface of the interface element is made of a material adapted to decreasing the emission of infrared radiation by said interface element towards the camera.

According to an embodiment, at least one inner surface of the interface element is covered with a coating adapted to decreasing the emission of infrared radiation by said interface element towards the camera.

According to an embodiment, the interface element comprises a first end adapted to engaging with the mount of the transparent element, for example by shape complementarity with said frame.

According to an embodiment, the interface element comprises a second end adapted to engaging with the infrared camera, for example by shape complementarity with at least a portion of said infrared camera.

According to an embodiment, the interface element comprises a first end shaped to engage with the mount and a second end shaped to engage with the camera. For example, the interface element comprises a body between the first and the second end.

According to an embodiment, the interface element is made up of two parts assembled on either side of the infrared camera. According to a specific embodiment, the interface element is in one piece.

According to an embodiment, the interface element has a hollow shape.

According to an embodiment where the infrared camera comprises at least one lens and a lens mount, said at least one lens being held by said lens mount, the second end of the interface element is adapted to engaging with the lens mount, for example by shape complementarity with said lens mount.

According to an embodiment where the infrared camera comprises at least one lens and a lens mount, said at least one lens being held by said lens mount, the interface element and the lens mount form one piece.

According to an embodiment, the interface element is provided with at least one temperature probe. For example, at least one temperature probe is coupled to a module for processing stray light fluxes, for example, a stray light flux emitted by the device.

According to an embodiment, the device comprises a removable shutter element adapted to shutting off the infrared camera, for example assembled to the interface element and/or arranged between the refractor element and the infrared camera. According to an example, the shutter element is covered with an emissive coating on a surface of said shutter element located in front of the infrared camera.

According to an embodiment, the interface element comprises at least one emitting inner surface facing the infrared camera and adapted to being positioned close to the transparent element, for example against the mount of the transparent element. According to an example, said inner surface is, for example, covered with an emissive coating on its surface located in front of the infrared camera.

According to an embodiment, the interface element comprises a portion adapted to being positioned in front of a region of the transparent element, for example an edge of said transparent element, so as to form a screen between said region of the transparent element and the infrared camera, said portion comprising an emitting surface facing the infrared camera. According to an example, said emitting surface is covered with an emissive coating.

The two above-described embodiments enable to intentionally degrade the vignetting on a region of the field of view of the infrared camera, preferably a region which is not critical for the targeted application, and to form an image of an inner surface of the interface element facing said degraded region of the field of view. The temperature determined by the image sensor in this degraded region of the field of view can then be used in a stray light flux processing module.

According to an embodiment, the infrared camera comprises a pixel array image sensor comprising an angular pixel adapted to capturing a light flux originating from an inner area of the interface element facing the image sensor and the field of view of the angular pixel, for example an inner area adapted to being positioned around the transparent element. According to an example, said inner area is covered with an emissive coating.

By angular pixel, there is meant a stray light flux, or stray heat flux, detection pixel, which is a pixel having a field of view modified with respect to that of image pixels of the pixel array, to favor the capture of stray heat. For example, each stray heat detection pixel is arranged to capture a larger portion of stray heat than each image pixel of the pixel array.

An embodiment provides a system comprising:

an infrared imaging device according to an embodiment and an element transparent to the infrared radiation of a spectral range;

the infrared camera of the device being adapted to detecting an infrared radiation of the spectral range through the transparent element;

the transparent element being inclined by an angle of inclination greater than 0° and smaller than 90° or smaller than 0° and greater than −90° with respect to an image capture direction.

According to an embodiment, the transparent element is surrounded by a mount and is inserted with said mount in the opening of a wall, at least a portion of the wall in which the transparent element is inserted being inclined by the same angle of inclination as the transparent element.

The transparent element comprises two surfaces, an entry surface and an exit surface, preferably substantially planar and parallel to each other.

Preferably, the wall is inclined by the angle of inclination around the opening. For example, the wall is totally inclined by the angle of inclination.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DESCRIPTION OF EMBODIMENTS

Figure 1A:
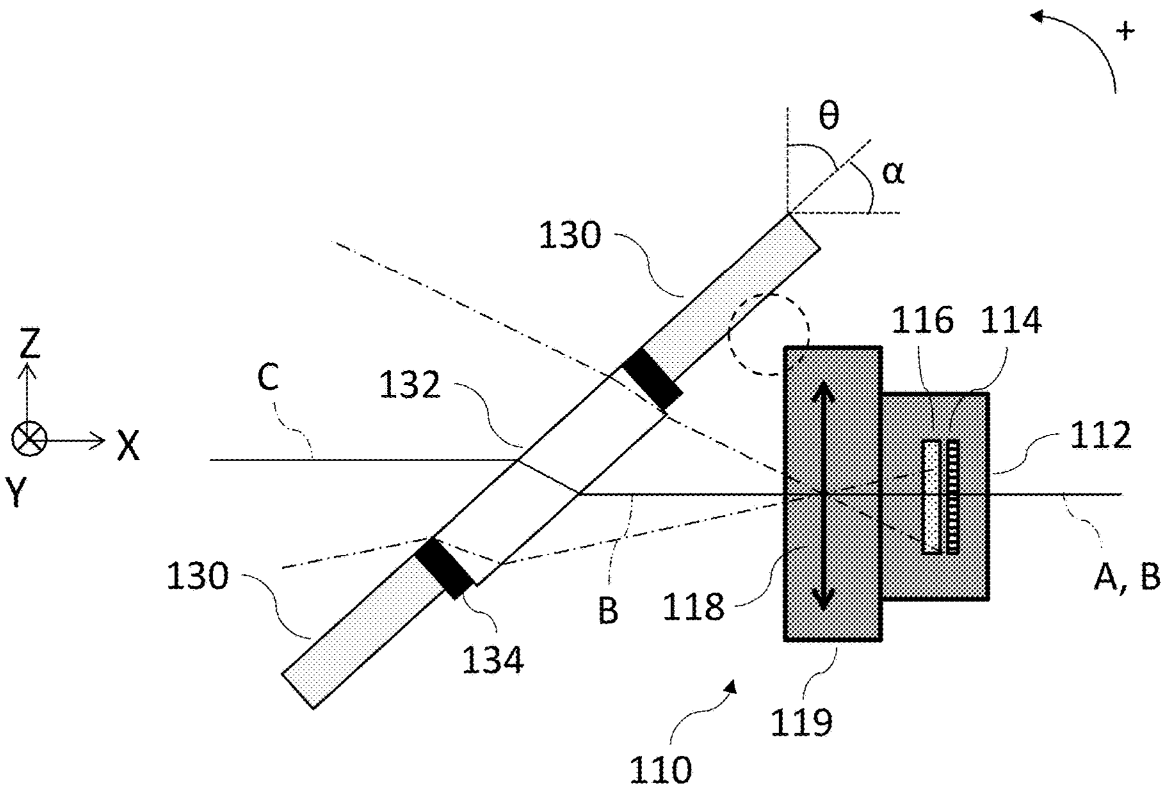
FIG. 1A.

Like features have been designated by like references in the various figures. In particular, the structural and/or functional features that are common among the various embodiments may have the same references and may dispose identical structural, dimensional and material properties.

For clarity, only those steps and elements which are useful to the understanding of the described embodiments have been shown and are described in detail. In particular, the optics, for example, the lenses and their mount, and the image sensor, for example, the array image sensor in the form of an array of microbolometers or of an array of photodiodes, are not detailed, being known by those skilled in the art in the field of the invention.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings or to an IR imaging device in a normal position of use.

When reference is made to the terms "input/output", "upstream/downstream", "front/back", "in front of/behind", it is referred to the propagation direction of the light rays/radiation in the device, that is, from the transparent element to the infrared camera.

When reference is made to angle values, it must be understood that these values are in the trigonometric direction, represented by the quarter-circle arrow with the "+" sign in the drawings. A negative angle value thus corresponds to an angle in a clockwise direction.

In the following description, the horizontal X, Y, and vertical Z directions are defined in the frame of reference of the infrared camera.

When reference is made to an "image capture direction", it is referred to the optical path of a light ray upstream of the transparent element which, after having crossed the transparent element and the refractor element, coincides with, or is parallel to, the optical axis of the camera.

When reference is made to a "refracted optical axis" of the transparent element or porthole, it is referred to the optical path of a light ray which, emitted in the image capture direction, has been refracted by said transparent element.

When reference is made to a "refracted optical axis" of the prism, it is referred to the optical path of a light ray which, emitted in the image capture direction, has been refracted by the transparent element and then by said prism.

When reference is made to a "prismatic tunnel diagram" or "tunnel diagram", it is referred to a two-dimensional diagram obtained by unfolding the prism, the unfolding being performed by planar symmetry of the prism, the plane of symmetry being a facet on which an internal reflection takes place (in the unfolded mode, the reflected optical axis is not deviated), such an unfolding being performed for each internal reflection in order to construct the tunnel diagram. In other words, a tunnel diagram shows, in the form of a straight line, the optical path taken by a light ray within the prism between the entry facet and the exit facet of said prism. In a tunnel diagram, a virtual exit facet is thus defined, but the actual entry facet is also shown.

Unless specified otherwise, the expressions "about", "approximately", "substantially", and "in the order of" signify plus or minus 10%, preferably of plus or minus 5%.

Figure 1B:
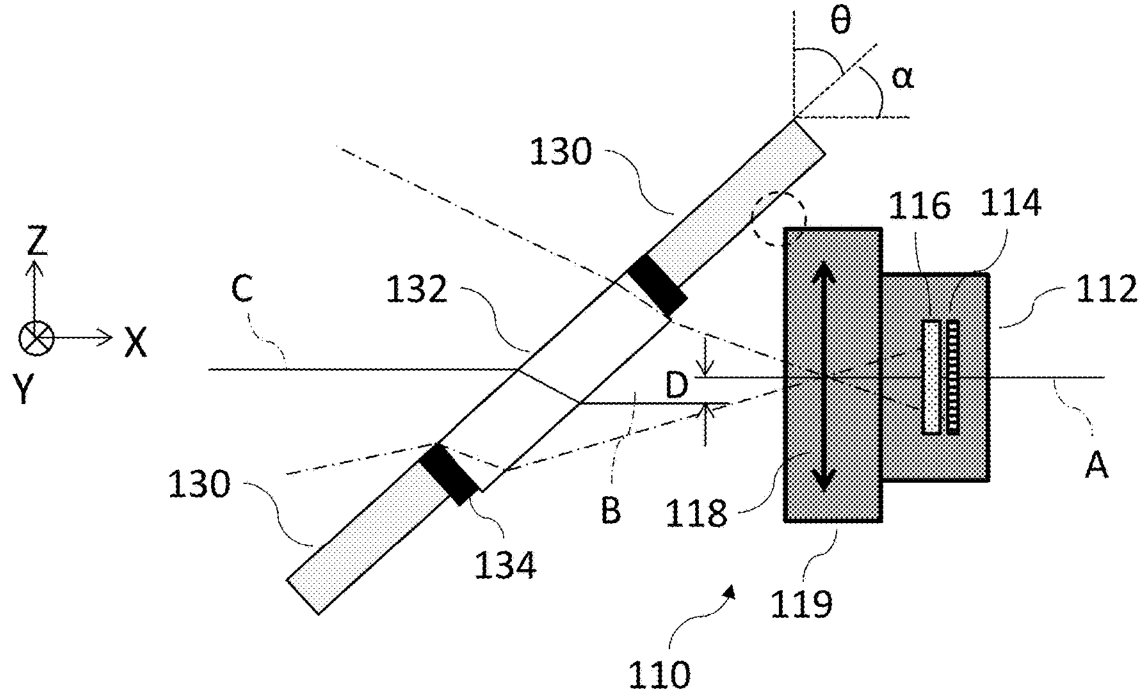
FIG. 1B are cross-section views showing an example of an infrared camera arranged behind an inclined wall.

An example of an infrared (IR) camera is shown in FIGS. 1A and 1B. Infrared camera 110 comprises a housing 112 containing an image sensor 114 sensitive to infrared radiation, as well as a window 116 located in front of image sensor 114 and capable of transmitting IR radiation in the spectral range of use of the IR camera, which is for example in the range from 1 to 20 μm, preferably from 8 to 14 μm, or even from 8 to 12 μm. The image sensor is advantageously an array image sensor formed of an array of microbolometers. Alternatively, the image sensor is an array image sensor formed of an array of photodiodes based on semiconductor materials.

The IR camera further comprises a plurality of lenses 118 (only one has been shown but there are usually a plurality thereof) capable of operating in the spectral range of use of the camera to form an image on the image sensor (the camera is in the image focal plane of the lenses), the lenses being held in a lens mount 119 assembled to housing 112. Lens mount 119 is positioned so that window 116 is arranged between said mount and image sensor 114. The sensor and the lens define the optical axis A of the camera. In the shown example, optical axis A is in the horizontal X direction.

IR camera 110 may be positioned in an enclosure, or at least be arranged behind a wall 130, so that the radiation is detected by the IR camera through said wall. Such an enclosure or wall may fulfil a function of mechanical and/or thermal protection of the camera, and/or a function of protection of the camera from the environment, and/or an aerodynamic function, and/or a user protection function (for example, a shield, in particular a windscreen), or even an aesthetic function (for example, to mask the camera).

Wall 130 may be a planar wall, as shown. Alternatively, it may locally comprise, in the vicinity of the camera, at least one planar wall portion.

The wall may be non-transparent to IR radiation, it may be unsuitable for transmitting an image, for example, it may be rough or scattering, or it may also not transmit IR radiation with a sufficient quality in the spectral range of use of the IR camera. In this case, a porthole 132 transparent to IR radiation in the spectral range of use of the IR camera may be inserted in an opening of the wall. Porthole 132 may, for example, be inserted in the wall by means of a porthole mount 134.

Porthole 132 is adapted to transmitting IR radiation to IR camera 110. For example, the porthole may be formed from a plate of zinc sulfide (ZnS), zinc selenide (ZnSe), silicon (Si), germanium (Ge), barium fluoride ($BaF_2$), calcium fluoride ($CaF_2$), sapphire, chalcogenide glass, or any other material transparent to IR radiation in the spectral range of use of the IR camera.

Porthole 132 is characterized by two substantially parallel surfaces having a given occupancy area (called "pupil"), the two surfaces being separated by a distance (thickness). The dimensions of the two surfaces (pupil dimensions) are, for example, in the order of one centimeter, or ten centimeters, with a thickness in the order of a few millimeters.

In certain applications, wall 130 and porthole 132 may be inclined by an angle θ with respect to the vertical direction. Angle θ is between 0 and 90°, and more specifically between 30° and 70°, for example around 60°. In other words, wall 130 and porthole 132 may be inclined by an angle α with respect to the image capture direction C, which is shown in the horizontal X direction. Angle α is complementary to angle θ, it is thus between 0 and 90°, and more specifically between 20° and 60°, for example around 30° or around 40°.

Further, it is sometimes desirable for the pupil of the porthole to be as small as possible. Indeed, given that the surface area occupied by the wall is decreased by the surface area occupied by the porthole and possibly by the porthole mount, this decreases the ability of the wall to fulfil its function, for example its protective or aesthetic function. Further, increasing the porthole pupil may alter the mechanical integrity of the wall. Further, the material used to form the porthole pupil has a non-negligible cost, which is desired to be decreased by decreasing the pupil size, and to a lesser extent its thickness.

However, the decrease of the porthole pupil size when the porthole is inclined has the consequence and the disadvantage of limiting the field of view (known as "FOV") of the IR camera, causing a vignetting phenomenon, since the rays at the ends of the field of view are cut off by the edge of the porthole. In particular, the vertical field of view ("VFOV") may be degraded with respect to the horizontal field of view ("HFOV") due to the inclination of the porthole.

The vignetting phenomenon worsens as the distance between the porthole and the IR camera increases. Thus, it is advantageous to position the IR camera as close as possible to the porthole, within the limit of the spacing between IR camera 110 and wall 130 (this limit is marked by the dotted circles in FIGS. 1A and 1B). This spacing is all the smaller as the angle of inclination θ is large (or the complementary angle α is small).

Further, if the optical axis A of IR camera 110 is centered on the refracted optical axis B of porthole 132, that is, the optical axis after refractive deflection in said porthole, as shown in FIG. 1A, then the IR camera may exhibit an asymmetrical vertical vignetting, for example a vignetting favoring the upper portion of the vertical field of view. A symmetrical vignetting can be obtained by vertically offsetting by a distance D the optical axis A of IR camera 110 with respect to the refracted optical axis B of porthole 132, as shown in FIG. 1B. However, this may have the effect of further decreasing the spacing between the IR camera and the wall, as can be seen by comparing FIGS. 1A and 1B.

There thus exists a need to do away with the constraint of spacing between the infrared camera and the inclined wall in order to control the vignetting phenomenon.

The inventors provide an infrared imaging device enabling to address these needs.

Examples of infrared imaging devices will be described hereafter. These examples are non-limiting and various variants will occur to those skilled in the art based on the indications of the present description.

Figure 2A:
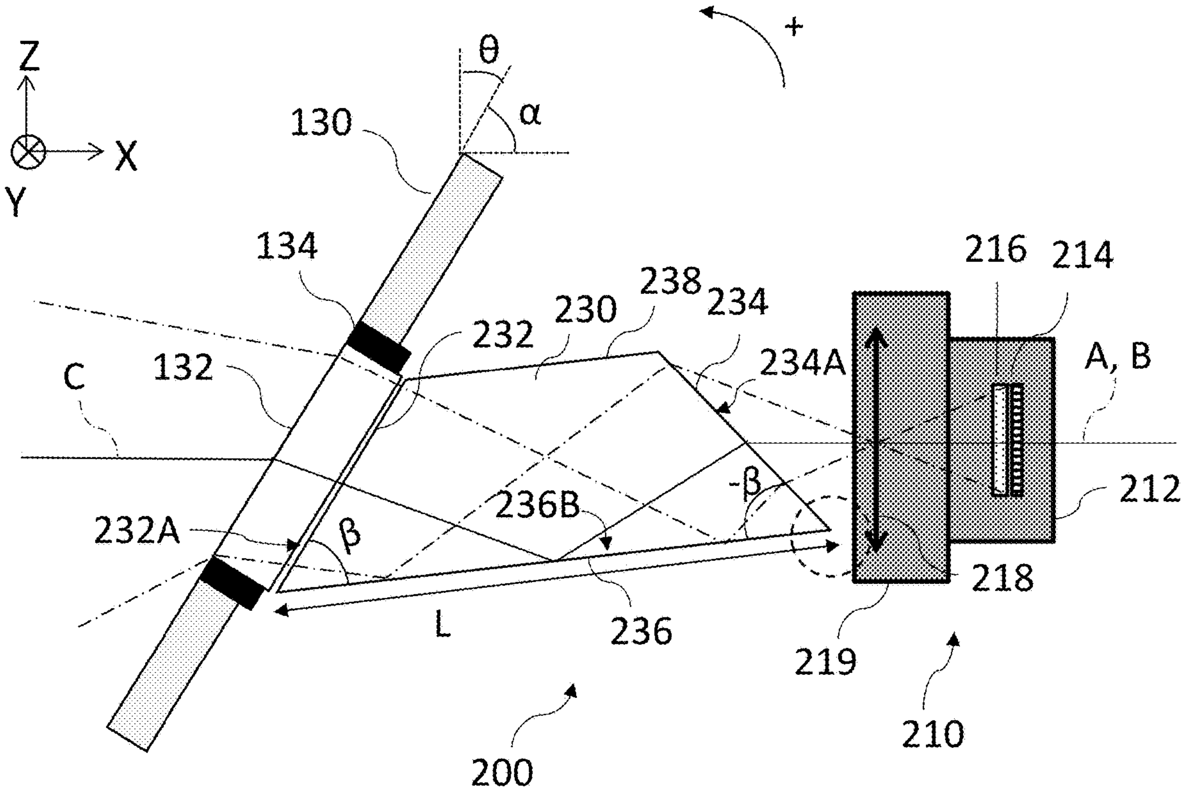
FIG. 2A is a cross-section view showing an example of an infrared imaging device according to an embodiment.

FIG. 2A is a cross-section view showing an example of an infrared imaging device according to an embodiment comprising an infrared camera 210 shown behind a wall 130 (which wall does not form part of the device).

Similarly to the infrared camera 110 described in relation with FIGS. 1A and 1B, infrared camera 210 comprises a housing 212 containing an image sensor 214 sensitive to infrared radiation, as well as a window 216 located in front of image sensor 214 and capable of transmitting IR radiation in the spectral range of use of the IR camera. Advantageously, the image sensor is an array image sensor comprising an array of microbolometers. Alternatively, the image sensor is an array image sensor comprising an array of photodiodes based on semiconductor materials.

In the rest of the disclosure, for the sake of brevity, the spectral range of use of the IR camera may be designated as the "spectral range".

The IR camera further comprises a plurality of lenses 218 capable of operating in the spectral range to form an image on the image sensor, the camera being in the image focal plane of the lenses. The lenses are held in a lens mount 219 assembled to housing 212, lens mount 219 being positioned so that window 216 is arranged between said mount and sensor 214. The sensor and the lenses define the optical axis A of the camera, shown substantially in the horizontal X direction.

Wall 130 is similar to the wall shown in FIGS. 1A and 1B. Thus, it comprises a porthole 132 (also designated as a "transparent element"), the porthole being transparent to infrared radiation in the spectral range. Porthole 132 is inserted with a porthole mount 134 into an opening of wall 130. The wall may be a shield, for example a windscreen. The wall may be a wall of an enclosure, for example a closed enclosure, particularly a closed enclosure adapted to being thermally regulated.

For example, the porthole may be formed from a plate made of zinc sulfide (ZnS), zinc selenide (ZnSe), silicon (Si), germanium (Ge), barium fluoride ($BaF_2$), calcium fluoride ($CaF_2$), sapphire, chalcogenide glass, or any other material transparent to IR radiation in the spectral range used by the IR camera.

Wall 130 and porthole 132 are inclined by an angle $\alpha$ with respect to image capture direction C, which is shown substantially in the horizontal X direction. The angle of inclination $\alpha$ is between 0 and 90°, and more specifically between 20° and 60°, for example around 30° or around 50°.

It is specified that the transparent element, for example the porthole, is characterized by two surfaces, an entry surface and an exit surface, which are substantially planar and parallel to each other. Further, it is specified that the angle of inclination of the wall locally corresponds to the angle of inclination of the porthole, that is, to the angle of inclination of the porthole at least at the location where the transparent element is inserted in the wall.

The infrared camera is adapted to capturing a thermal image of a scene through the inclined porthole.

IR imaging device 200 further comprises a refractive prism 230 (refractor element) transparent to the radiation in the spectral range. Prism 230 is positioned between porthole 132 and IR camera 210.

The prism 230 shown is a Dove prism. It has the shape of a pyramid with a truncated rectangular base comprising a first base 236 (large base), a second base 238 (small base) with a smaller surface area than said first base and substantially parallel to the first base 236, a first lateral plane 232 (entry facet) coupling the first and second bases and inclined by an angle $\beta$ with respect to the first base 236, a second lateral plane 234 (exit facet) coupling the first and second bases, facing the first lateral plane and inclined with respect to the first base 236 by an angle $-\beta$ opposite to angle $\beta$. Angle $\beta$ is greater than 0° and smaller than 90°, for example between 3° and 60°. The first lateral plane 232 forms an entry facet, the second lateral plane 234 forms an exit facet, and the large base 236 forms an intermediate facet.

Figure 3:
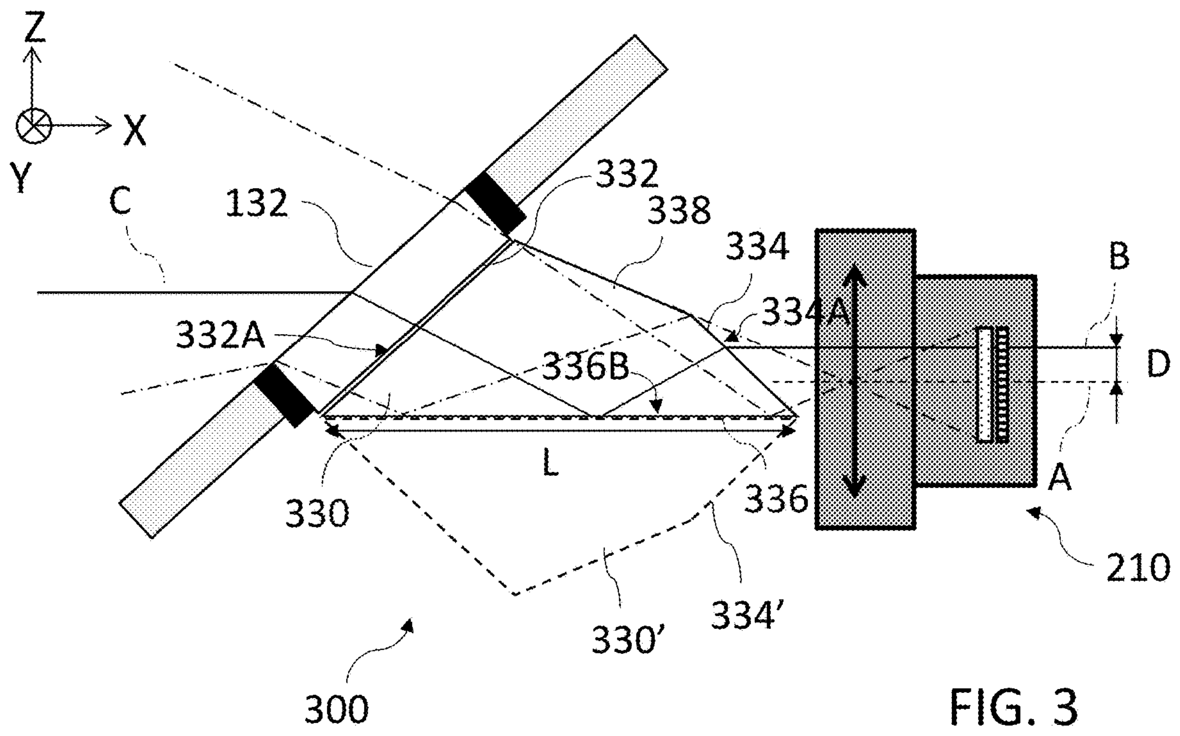
FIG. 3 is a cross-section view showing another example of an infrared imaging device according to an embodiment.

In the example shown in FIG. 2A, the entry and exit facets are substantially of same size, but this is not limiting, as will be seen in the description in relation with FIG. 3.

Entry facet 232 is adapted to refracting an infrared ray of the spectral range penetrating into the prism, and is positioned in front of transparent element 132. Exit facet 234 is adapted to refracting the infrared ray coming out of the prism, and is positioned in front of infrared camera 210. Intermediate facet 236 is adapted to reflecting the infrared ray between the entry facet and the exit facet.

According to an example, angle $\beta$ of prism 230 is selected so that said prism can be inserted between the inclined porthole 132 and infrared camera 210. Angle $\beta$ may be selected to be substantially equal to the angle of inclination $\alpha$ of the wall: in this case, the large base 236 of the prism 230 may be positioned in the horizontal X direction, as can be seen in the configuration of FIG. 2C. This is however not limiting and the large base 236 of prism 230 may be inclined with respect to the horizontal X direction, as can be seen in FIG. 2A, where angle $\beta$ of the prism is different from the angle of inclination $\alpha$.

According to another example, angle $\beta$ is imposed and infrared camera 210 is positioned to capture the infrared radiation refracted by the exit facet 234 of prism 230.

According to an example, the length L of prism 230, that is, the length in the XZ plane of the large base 236 of the prism, can be defined so that the refracted optical axis B of the prism runs through the centers of the entry 232 and exit 234 facets. According to another example, the length L of prism 230 can be defined so that the refracted optical axis B of the prism is off-centered with respect to the centers of the entry 232 and exit 234 facets.

In the example shown in FIG. 2A, prism 230 and infrared camera 210 are positioned relative to each other so that the refracted optical axis B of prism 230 substantially coincides with the optical axis A of the infrared camera, but this is not limiting, as will be seen in the description in relation with FIG. 2C.

The use of a refractor element such as prism 230 between the porthole and the IR camera enables to narrow the IR rays coming from the ends of the field of view of the IR camera, in order to limit the vignetting phenomenon, in particular the vignetting phenomenon linked to the distance between the infrared camera and the porthole. This enables to avoid for IR rays at the ends of the field of view of the IR camera from being cut off by the edge of the porthole, or at least to limit this phenomenon. This further enables to displace the constraint of spacing between the IR camera and the wall, and to substantially lighten it, and this, whatever the angle of inclination $\alpha$ of the wall. The spacing limit between the IR camera and the wall is transferred between the prism and the IR camera, as shown by the dotted circle in FIG. 2A, but it is less constraining since, due to refraction by the prism, it is not necessary for the IR camera to be against the prism for the IR rays at the edges of the porthole to be captured by said camera.

The device comprises means (not shown) for assembling the prism to the wall, for example to the porthole mount.

Figure 6A:
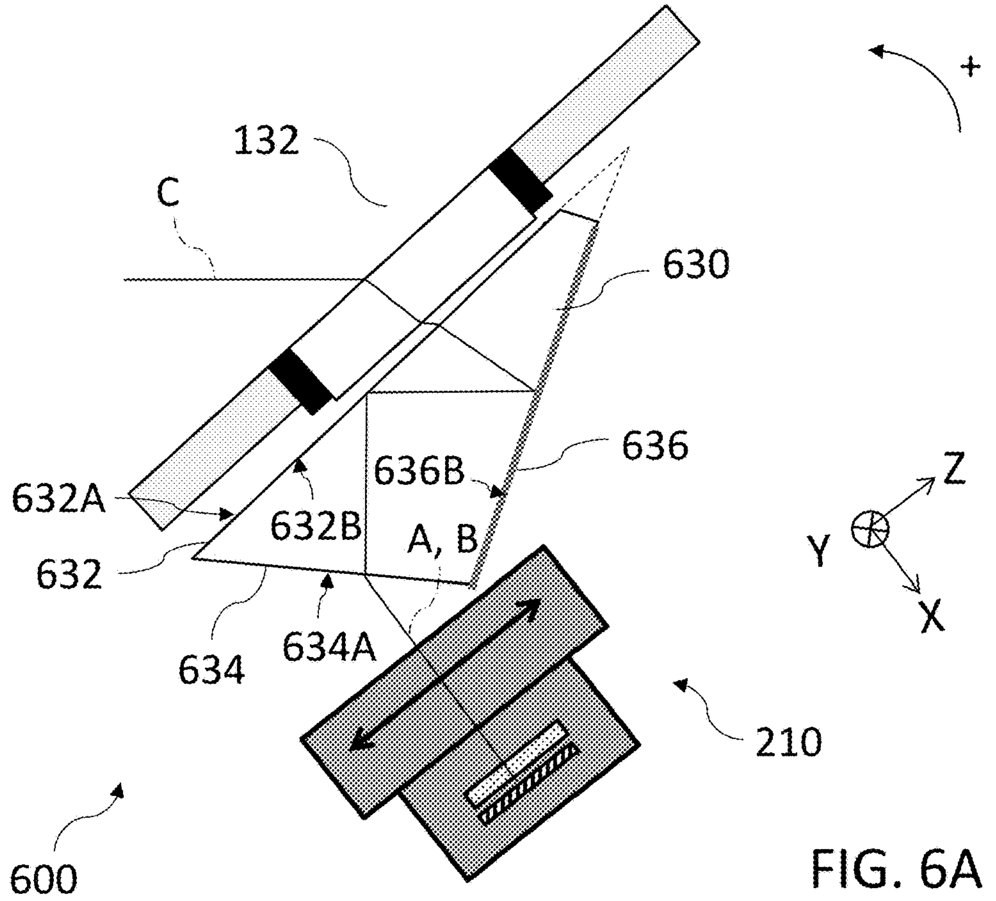
FIG. 6A is a cross-section view showing another example of an infrared imaging device according to an embodiment.

One or a plurality of the following examples, described in relation with the device 200 of FIG. 2A, may also apply to another example of a device according to an embodiment, for example to the prism 600 described hereafter in relation with FIG. 6A:

- the refractor element, for example, prism 230, may be made of the same material as porthole 132;
- the refractor element, for example prism 230, may be made of zinc sulfide (ZnS), zinc selenide (ZnSe), silicon (Si), germanium (Ge), barium fluoride ($BaF_2$), calcium fluoride ($CaF_2$), sapphire, chalcogenide glass;
- the inner surface of the intermediate facet of the refractor element, for example the inner surface 236B of the intermediate facet 236 of prism 230, may be covered with a reflective coating adapted to increasing the reflection of infrared radiation on said inner surface, for example a metallic coating;
- the intermediate facet of the refractor element, for example the intermediate facet 236 of prism 230, may comprise at least one surface adapted to correcting optical aberrations, for example an uneven, non-axi-symmetrical surface of free-form type;

the outer surface of the entry facet of the refractor element, for example the outer surface 232A of the entry facet 232 of prism 230, may be covered with an anti-reflective coating;

the outer surface of the exit facet of the refractor element, for example the outer surface 234A of the exit facet 234 of the prism 230, may be covered with an anti-reflective coating;

the surfaces of the refractor element which are not concerned by the optical functions, for example the outer and/or inner surface of the small base 238 and/or the outer surface of the large base 236 of prism 230, may be frosted and/or structured according to an anti-stray light function.

A Dove prism has the advantage of limiting optical aberrations and chromatic dispersions. In particular, this may enable to limit blurring in the image captured by the camera. This advantage is due to the positioning of the exit facet with respect to the entry facet, as explained in the following.

Figure 2B:
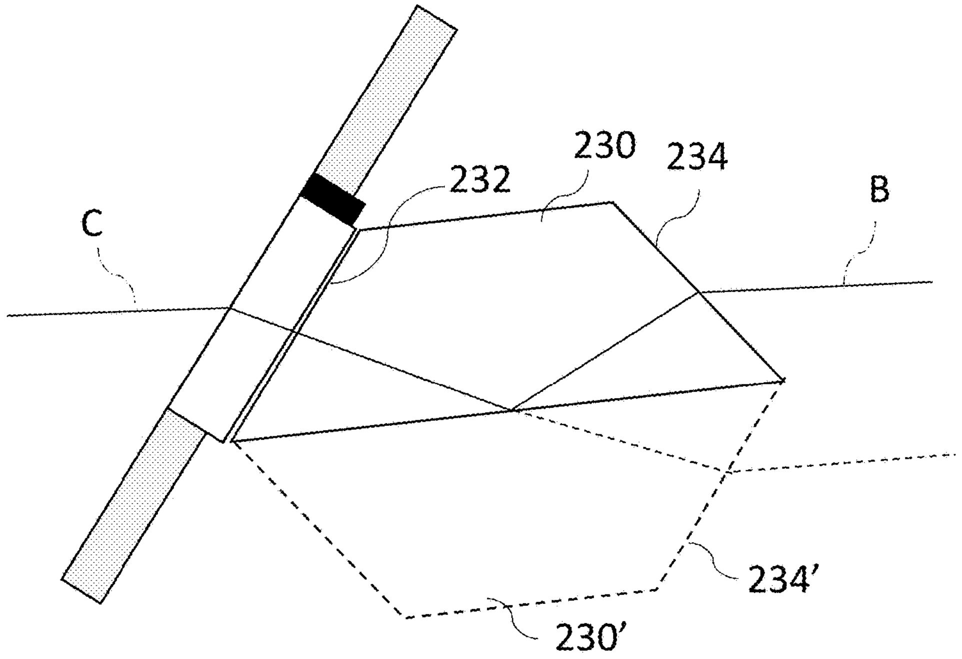
FIG. 2B shows a view of a tunnel diagram of the prism of the infrared imaging device of FIG. 2A.
Figure 2C:
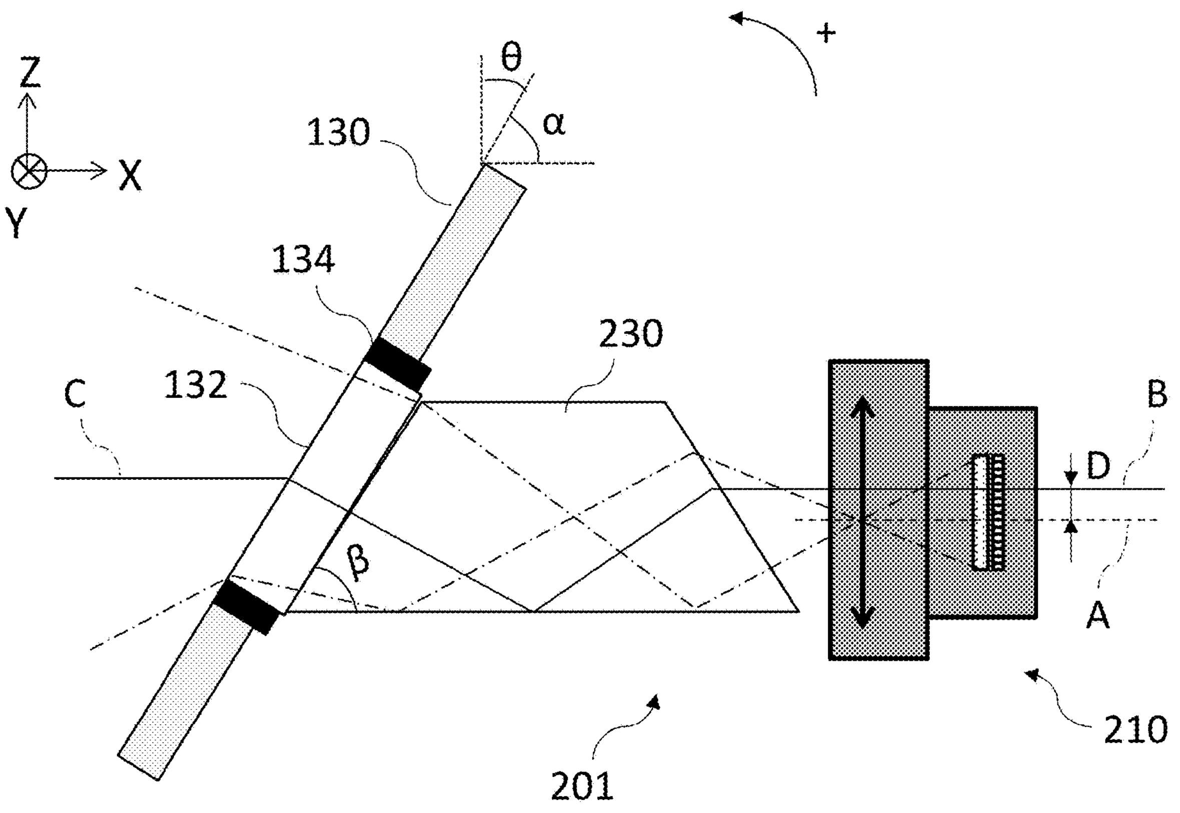
FIG. 2C is a cross-section view showing a variant of the example of infrared imaging device of FIG. 2A.

FIG. 2B shows a view of a tunnel diagram of the prism 230 of the infrared imaging device of FIG. 2A. In this diagram, virtual prism 230' is obtained by virtually unfolding prism 230 at each internal reflection, forming a virtual exit facet 234' which is parallel to the entry facet 232. This configuration gives prism 230 its non-dispersive character.

FIG. 2C is a cross-section view showing a variant of the example of infrared imaging device of FIG. 2A. The device 201 of FIG. 2C differs from the device 200 of FIG. 2A mainly in that the optical axis A of camera 210 is offset by a distance D from the refracted optical axis B of prism 230 in the vertical Z direction. This may enable, in certain cases, to make the field of view of camera 210 symmetrical, in order not to favor the upper field of view over the lower one, or conversely.

Prism 230 operates by inverting the image by 180° with respect to optical axis A. The image being further inverted by 180° by the lenses of the IR camera, the initial orientation of the captured scene is thus restored. For example, if the lower field of view is desired to be favored, the shift may be oriented downwards, as shown; if, conversely, the upper field of view is desired to be favored, the shift may be oriented upwards.

FIG. 3 is a cross-section view showing another example of an infrared imaging device 300 according to an embodiment, which differs from the infrared imaging device 201 of FIG. 2C mainly in that the small base 338 of Dove prism 330 is not parallel to the large base 336 (intermediate facet). As a result, entry facet 332 and exit facet 334 do not have the same surface area. However, as can be seen with the virtual prism 330' of the tunnel diagram of prism 330, virtual exit facet 334' is always parallel to entry facet 332.

According to an example, entry facet 332 may have a surface area substantially equal to the pupil of porthole 132, while exit facet 334 may have a smaller surface area.

According to an example, the length L of prism 330 may be defined so that the refracted optical axis B of the prism runs through the center of entry facet 332 and of exit facet 334 of smaller size.

Figure 4:
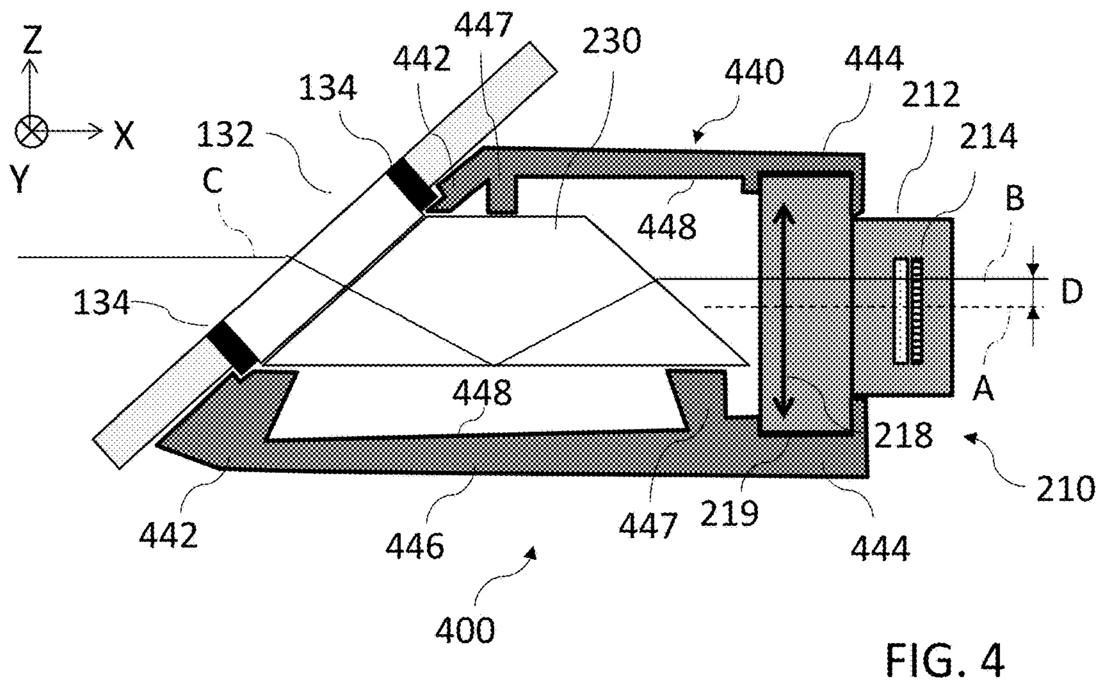
FIG. 4 is a cross-section view showing another example of an infrared imaging device according to an embodiment.

FIG. 4 is a cross-section view showing another example of an infrared imaging device 400 according to an embodiment, which differs from the IR imaging device 201 of FIG. 2C mainly in that it further comprises an interface element 440 positioned between infrared camera 210 and porthole mount 134. Interface element 440 is adapted to forming an interface between said infrared camera and said porthole mount. This interface element is further adapted to holding refraction prism 230 between porthole 132 and infrared camera 210.

Interface element 440 enables to accurately position infrared camera 210 with respect to porthole 132, as well as prism 230 with respect to the porthole and to the infrared camera, in the direction of optical axis A (the horizontal X direction in the shown example), and in a direction perpendicular to optical axis A (the vertical Z direction in the shown example). In the example shown in FIG. 4, the optical axis A of camera 210 is offset in vertical direction Z with respect to the refracted optical axis B of the prism. According to another example, similar to FIG. 2A, the optical axis A of the camera may coincide with the refracted optical axis B of the prism.

The shown interface element 440 is a rigid, one-piece element having an external truncated cylinder shape, adapted to being inserted between porthole mount 134 and IR camera 210. The shown interface element 440 comprises:

a first end 442 shaped to engage with porthole mount 134 by shape complementarity with said mount, thus assembling to wall 130 all around porthole 132;

a second end 444 shaped to engage with lens mount 219 by shape complementarity with said lens mount;

a body 446 between the first and the second end.

According to an alternative example, the second end of the interface element may be shaped to engage with the housing 212 of the IR camera, or both with lens mount 219 and with housing 212.

Body 446 forms an envelope which is preferably opaque to light radiation in a given spectral range. Said envelope is thus preferably adapted to blocking all or part of stray light rays coming from the back of wall 130, likely to penetrate into the space between said wall and IR camera 210, for example in the optical path between porthole 132 and IR camera 210, stray light rays being capable of generating a ghost image on image sensor 214.

Holding rings 447 extend within body 446 and are shaped to bear against prism 230 to hold it and center it in a given position between porthole 132 and infrared camera 210. Preferably, holding rings 447 bear on surfaces of the prism other than the entry and exit facets, for example on the large base and/or the small base, and/or on one or a plurality of lateral facets perpendicular to the Y direction.

In the shown example, interface element 440 is an element separate from wall 130 and from infrared camera 210. This enables to ease the replacing of the different elements of the wall and/or of the IR imaging device, for example in the event of a maintenance, or when the interface element has to be changed to be able to place the infrared camera behind a different wall or behind an identical wall with a different angle of inclination, or when the wall has to be replaced, for example if it is damaged during its use.

Although FIG. 4 shows an example of embodiment of the interface element, other examples of design, described in the following, may apply to the interface element.

According to an example, the interface element may form one piece with the lens mount, or even with the housing of the infrared camera.

According to an advantageous example, the interface element may be adapted to forming a fluid-tight seal between the porthole mount and the IR camera. This may enable to decrease variations in the composition of the gas, for example air, in the space between the porthole and the IR camera and contained in said interface element. For example, this may enable to decrease humidity, particles, and/or dust in said space, so as to provide as constant as possible an image quality, or at least to limit image quality variations. For example, the space between the porthole and the IR camera may be saturated with nitrogen, with a low concentration of particles and/or dust, before being enclosed in the interface element. This may also protect the prism from certain environmental conditions. According to an example, the prism may be made of a material which has strong thermo-optical properties, and may require being partly thermally regulated. According to an example, the prism may be made of a water-soluble material and has to be protected from deterioration in case of an environment with a high relative humidity rate.

According to an example, at least a first inner surface of the interface element is formed from a material absorbing in the spectral range of use of the IR camera or is covered with a coating absorbing in said spectral range.

According to an example, at least a second inner surface of the interface element is formed from a material reflective in the spectral range of use of the IR camera, for example metallic, or is covered with a coating reflective in said spectral range, for example a metallic coating.

According to an example, the interface element comprises at least one first inner surface formed from a material absorbing in the spectral range of use of the IR camera or covered with a coating absorbing in said spectral range, and at least one second inner surface formed from a material reflective in said spectral for example metallic, or covered with a coating reflective in said spectral range, for example a metallic coating.

The first and second surfaces are, for example, defined according to an exposure to a stray light radiation and/or according to a temperature gradient likely to impact them.

According to an example, all or part of the inner surfaces of the interface element are shaped to limit the emission of stray light radiation by said interface element towards the IR camera, for example the inner surfaces of the interface element inclined towards the camera are decreased or even excluded.

According to an example, the interface element comprises, inside of said element, at least one structure adapted to limiting the emission of stray light radiation by said interface element towards the camera, for example a structure of screen, mask, and/or light trap type. It may be a structure (or structures) regularly arranged around the optical axis in the interface element, or structures irregularly arranged around the optical axis in the interface element.

According to an example, the interface element is made of a material having a low thermal conduction, for example a thermal conduction lower than 10 $W \cdot m^{-1} \cdot K^{-1}$. This enables to favor the thermal insulation between the porthole and the IR camera, and thermal insulation of the prism. Indeed, the environment around the porthole may undergo temperature variations, particularly according to the conditions outside of the wall, which temperature variations may degrade the performance of the infrared camera and/or generate non-uniformities in the response between different pixels in a pixel array (for a pixel array infrared camera), particularly by generating a stray heat flux. For example, when the wall is a portion of an enclosure capable of being thermally regulated, the combination of the thermal regulation in the enclosure and of the thermal insulation by the interface element enables to obtain an improved performance of the infrared camera.

According to an example, the interface element is provided with at least one temperature probe. A temperature probe may preferably be arranged inside of said interface element, but may also be arranged outside of said interface element. For example, a plurality of temperature probes may be positioned at different points of the interface element to be able to determine a temperature gradient.

According to an example, at least one temperature probe is coupled to a module for processing the stray light flux, that is, the light flux captured by the infrared camera but originating from at least one source other than the scene, for example a stray light flux emitted by the device and/or the porthole. The stray light flux processing module may be included in, or be coupled to, an image processing module in order to determine the light flux essentially originating from the scene, for example by correcting it of stray light flux.

Alternatively, all or part of the stray light flux may be determined without a temperature probe, and thus simplify the infrared imaging device. For example, the interface element may comprise:

- at least one emitting inner surface facing the infrared camera and positioned close to the transparent element, for example against the mount of the transparent element, said inner surface being for example covered with an emissive coating on its surface facing the infrared camera; and/or
- a portion positioned in front of a region of the transparent element, for example an edge of said transparent element, in such a way as to form a screen between said region of the transparent element and the infrared camera, said portion comprising an emitting surface facing the infrared camera, for example covered with an emissive coating.

According to an example, the infrared camera may comprise a pixel array image sensor comprising an angular pixel adapted to capturing a light flux originating from an inner area of the interface element facing the image sensor and within the field of view of said angular pixel, for example an inner area positioned around the transparent element, the area being for example covered with an emissive coating.

Examples of an infrared camera with a stray heat flux detection pixel, of a method for calibrating such an infrared camera, and of a method of correcting an image captured by such an infrared camera are described in international patent applications WO2019234215A1 and WO2019234216A1.

These examples of embodiment of the interface element, as well as others, are described in the application "infrared imaging device" filed by the same applicant on the 24 Sep. 2021 under number FR2110092.

Figure 5:
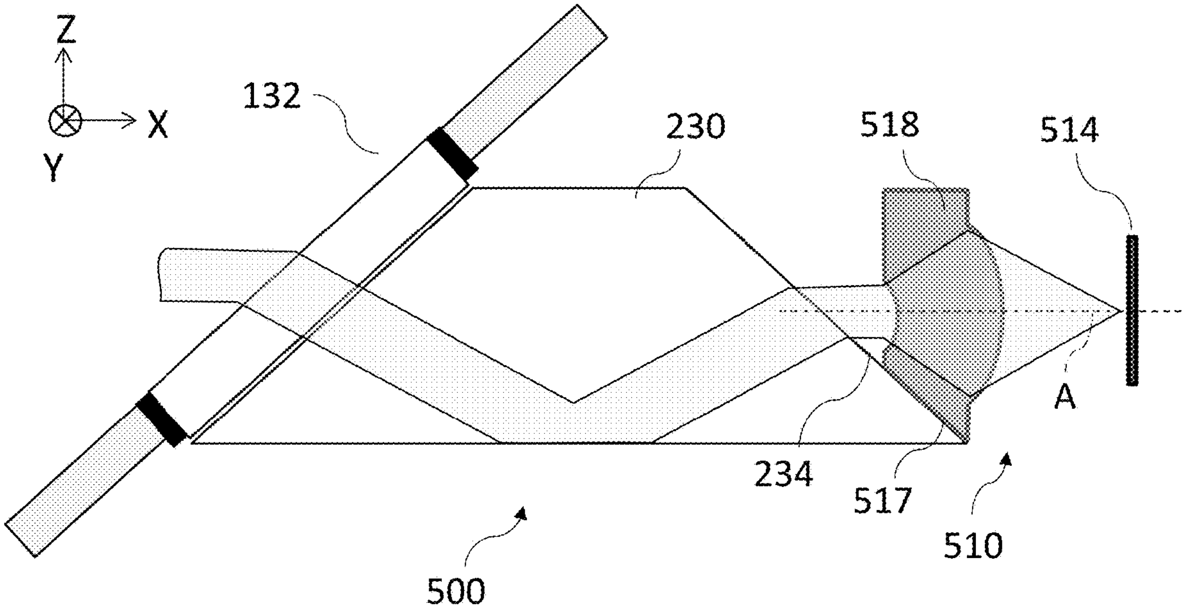
FIG. 5 is a cross-section view showing another example of an infrared imaging device according to an embodiment.

FIG. 5 is a cross-section view showing another example of an infrared imaging device 500 according to an embodiment, which differs from the device 200 of FIG. 2A mainly in that at least one lens 518 of infrared camera 510 comprises a truncated surface 517 facing the exit facet 234 of prism 230. The lens mount, not shown, is also truncated. This enables to position infrared camera 210 as close as possible to prism 230. By decreasing the distance between the infrared camera and the prism, the optical distance between the infrared camera and the porthole is decreased and the vignetting phenomenon can be further decreased, if necessary. According to an example, truncated surface 517 is substantially parallel to exit surface 234.

Preferably, the lens truncation is designed not to degrade the optical performance of the lens. According to an example, a truncated lens has at least one uneven optical surface, for example of free-form type. The uneven optical surface is preferably at least non-axisymmetrical.

FIG. 6A is a cross-section view showing another example of an infrared imaging device 600 according to an embodiment, which differs from the device 200 of FIG. 2A mainly in that the refractor element is a Bauernfeind prism 630, instead of a Dove prism.

Bauernfeind prism 630 is a half pentaprism comprising a base 632 forming the entry facet, a first lateral plane 636 positioned in front of the base and forming the intermediate facet, and a second lateral plane 634, coupling the base and the first lateral plane and forming the exit facet. Entry facet 632 is positioned in front of porthole 132. Exit facet 634 is positioned in front of infrared camera 210. The facets 632, 634, 636 of prism 630 are oriented with respect to one another so that an infrared ray is refracted through the entry facet at an angle equal to the angle of incidence of the exit facet.

Infrared camera 210 is positioned to capture the infrared radiation refracted by the exit facet 634 of prism 630.

In the shown example, prism 630 and infrared camera 210 are positioned relative to each other so that the refracted optical axis B of the prism substantially coincides with the optical axis A of the infrared camera.

According to another example, the optical axis A of camera 210 may be offset from the refracted optical axis B of the prism in the vertical Z direction.

The use of a refractor element such as prism 630 between the porthole and the IR camera enables, similarly to prism 230 of FIG. 2A, to narrow the IR rays originating from the ends of the field of view of the IR camera, to limit the vignetting phenomenon, in particular the vignetting phenomenon linked to the distance between the infrared camera and the porthole. This enables to avoid for IR rays at the ends of the field of view of the IR camera from being cut off by the edge of the porthole, or at least to limit this phenomenon. This also enables to displace the constraint of spacing between the IR camera and the wall, and to substantially lighten it, and this, whatever the angle of inclination $\alpha$ of the wall.

The other features and examples described in relation with the devices of FIGS. 2A-2C, 4, and 5 can be adapted to a Bauernfeind prism.

A Bauernfeind prism has the advantage of limiting optical aberrations and chromatic dispersion, which can help limiting blurring in the image captured by the camera. This advantage is due to the positioning of the exit facet with respect to the entry facet, as explained in the following.

Figure 6B:
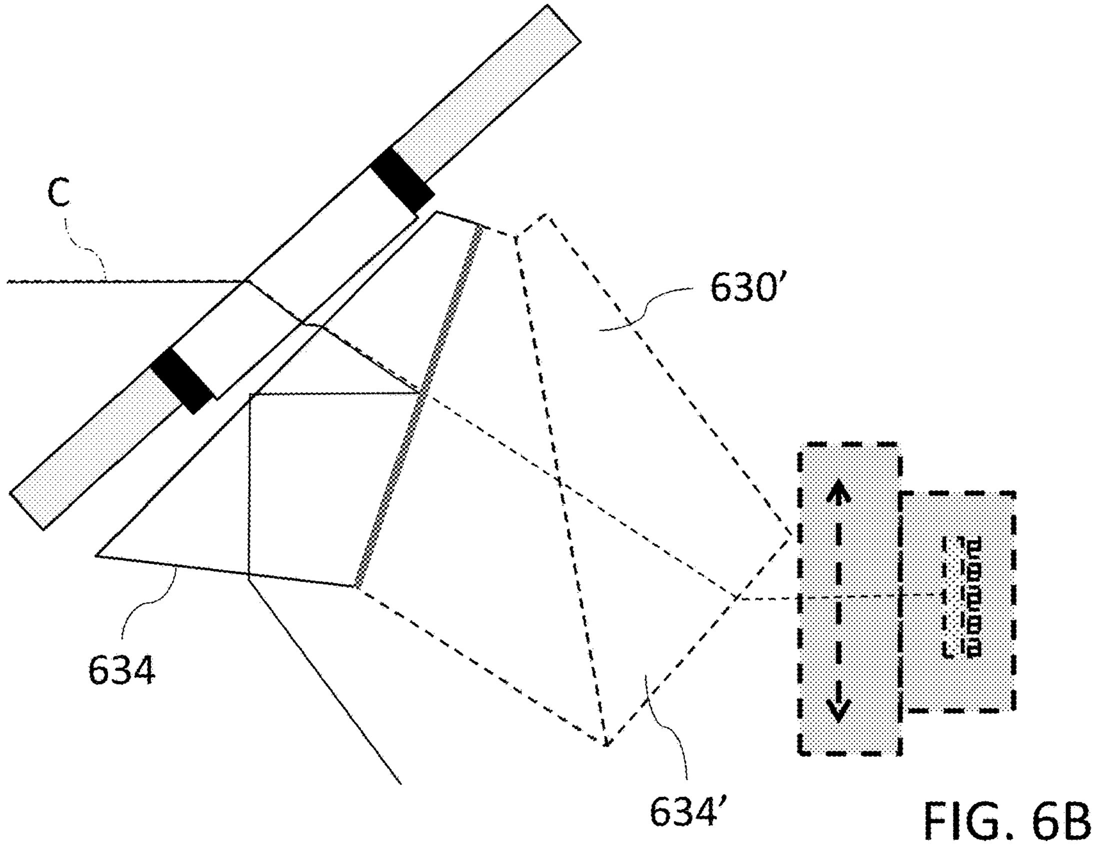
FIG. 6B shows a view of a tunnel diagram of the prism of the infrared imaging device of FIG. 6A.

FIG. 6B shows a view of a tunnel diagram of the prism of the infrared imaging device of FIG. 6A. In this diagram, virtual prism 630' is obtained by virtually unfolding prism 630 at each internal reflection, forming a virtual exit facet 634' which is parallel to entry facet 632. This configuration gives the prism 630 its non-dispersive character.

As compared with a Dove prism, the use of a Bauernfeind prism has the advantage of being more compact, enabling in particular to decrease material costs.

Various embodiments and variants have been described. Those skilled in the art will understand that certain features of these various embodiments and variants may be combined, and other variants will occur to those skilled in the art. In particular, all embodiments may be carried out with or without an offset between the optical axis of the infrared camera and the refracted optical axis of the refractor element. Further, in the embodiments, the image sensor housing and the lens mount may form one piece.

Finally, the practical implementation of the described embodiments and variants is within the abilities of those skilled in the art based on the functional indications given hereabove.

The invention claimed is:

1. Infrared imaging device comprising an infrared camera having an optical axis (A), said camera being intended to detect an infrared radiation in a spectral range through an element transparent to said infrared radiation, the transparent element being inclined by an angle of inclination ($\alpha$) greater than 0° and smaller than 90° or smaller than 0° and greater than −90° with respect to an image capture direction (C);

the device further comprising a refractor element transparent to the infrared radiation in the spectral range and capable of being positioned between the transparent element and the infrared camera, said refractor element comprising a virtual exit facet of the refractor element, corresponding to an exit facet of the refractor element in a tunnel diagram of said refractor element, said virtual exit facet being substantially parallel to an entry facet of the refractor element;

the transparent element having an entry facet and an exit facet, substantially planar and parallel to each other, being surrounded by a mount, and being adapted to being inserted with said mount into the opening of a wall, at least a portion of the wall in which the transparent element is inserted being inclined by the same angle of inclination ($\alpha$) as the transparent element;

the entry facet being adapted to refracting an infrared ray of the spectral range penetrating into the refractor element, and being intended to be positioned in front of the transparent element, the exit facet being adapted to refracting the infrared ray coming out of the refractor element, and being positioned in front of the infrared camera, the refractor element further comprising at least one intermediate facet adapted to reflecting the infrared ray between the entry facet and the exit facet; and the refractor element being a Dove prism type, said prism having the shape of a pyramid with a truncated rectangular base comprising a first base, a second base having a smaller surface area than said first base, a first lateral plane coupling the first and second bases and inclined by a first angle ($\beta$) with respect to the first base, a second lateral plane coupling the first and second bases, in front of the first lateral plane and inclined by a second angle ($-\beta$) with respect to the first base, the second angle being the opposite of the first angle, the first angle ($\beta$) being greater than 0° and smaller than 90°, the first lateral plane forming the entry facet, the second lateral plane forming the exit facet, and the first base forming the intermediate facet.

2. Device according to claim 1, the inner surface of the intermediate facet being covered with a reflective coating adapted to increasing the reflection of the infrared radiation on said inner surface, for example a metallic coating.

3. Device according to claim 1, the intermediate facet comprising at least one surface adapted to correcting optical aberrations, for example an uneven surface, of free-form type, for example non-axisymmetrical.

4. Device according to claim 1, the refractor element and the infrared camera being positioned with respect to each other so that the refracted optical axis ($\beta$) of the refractor element is substantially parallel to, or substantially coincides with, the optical axis (A) of the infrared camera.

5. Device according to claim 4, the optical axis (A) of the infrared camera being offset by a distance (D) with respect to the refracted optical axis (β) of the refractor element in a direction (Z) perpendicular to said refracted optical axis.

6. Device according to claim 1, the outer surface of the entry facet and/or the outer surface of the exit facet being coated with an anti-reflective coating.

7. Device according to claim 1, the prism generating no chromatic dispersion.

8. Device according to claim 1, the first angle (β) being between 3° and 60°.

9. Device according to claim 1, the entry facet of the refractor element having a surface area greater than or equal to the surface area of the transparent element.

10. Device according to claim 1, the entry facet of the refractor element being substantially parallel to the transparent element.

11. Device according to claim 1, the exit facet having a surface area substantially equal to the surface area of the entry facet.

12. Device according to claim 1, the exit facet having a smaller surface area than the entry facet.

13. Device according to claim 1, the infrared camera further comprising at least one lens and a lens mount, said at least one lens being held by said lens mount, at least one lens and/or the lens mount comprising a truncated surface adapted to being positioned in front of the exit facet of the refractor element, the truncated surface being for example substantially parallel to the exit facet.

14. Device according to claim 1, the infrared camera comprising:

at least one lens and a lens mount, said at least one lens being held by said lens mount;

an image sensor sensitive to the infrared radiation in the spectral range;

the image sensor and the at least one lens defining the optical axis (A) of the infrared camera, the image sensor being arranged substantially in the image focal plane of said at least one lens.

15. Device according to claim 1, the device comprising means for attaching the refractor element adapted to attaching said refractor element to the wall or to the mount.

16. Device according to claim 1, the device comprising an interface element adapted to forming an interface between the infrared camera and the mount, said interface element being further adapted to holding the refractor element between the transparent element and the infrared camera.

17. Infrared imaging system comprising:

an infrared imaging device according to claim 1, and an element transparent to the infrared radiation of a spectral range;

the infrared camera of the device being adapted to detecting an infrared radiation of the spectral range through the transparent element;

the transparent element being inclined by an angle of inclination (α) greater than 0° and smaller than 90° or smaller than 0° and greater than −90° with respect to the image capture direction (C), the transparent element comprising an entry surface and an exit surface which are substantially planar and parallel to each other, being surrounded by a mount, and being inserted with said mount in the opening of a wall, at least a portion of the wall in which the transparent element is inserted being inclined by the same angle of inclination (α) as the transparent element.

* * * * *